(12) United States Patent
Erickson et al.

(10) Patent No.: US 10,169,737 B2
(45) Date of Patent: Jan. 1, 2019

(54) CONVERTING ASSETS FOR REUSE DURING MANUFACTURING

(75) Inventors: Steven C. Erickson, Rochester, MN (US); Ivory W. Knipfer, Rochester, MN (US); Jason S. Lee, Oronoco, MN (US); Fraser A. Syme, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 12/130,973

(22) Filed: May 30, 2008

(65) Prior Publication Data
US 2009/0299882 A1    Dec. 3, 2009

(51) Int. Cl.
*G06Q 10/06* (2012.01)
*G06Q 10/08* (2012.01)

(52) U.S. Cl.
CPC ........... *G06Q 10/087* (2013.01); *G06Q 10/06* (2013.01)

(58) Field of Classification Search
USPC ......................................................... 705/28
See application file for complete search history.

(56) References Cited

U.S. PATENT DOCUMENTS

| | | | | |
|---|---|---|---|---|
| 5,226,246 A | * | 7/1993 | Soo ................................ | 36/50.1 |
| 5,815,740 A | * | 9/1998 | Wagner ............................ | 396/6 |
| 5,867,714 A | * | 2/1999 | Todd .......................... | G06F 8/64 |
| | | | | 707/999.01 |
| 5,965,858 A | * | 10/1999 | Suzuki ................... | G06K 17/00 |
| | | | | 209/630 |
| 6,009,406 A | * | 12/1999 | Nick ............................ | 705/7.24 |

(Continued)

OTHER PUBLICATIONS

Zewdie, Berhane, et al.; "Adaptive Component Paradigm for Highly Configurable Business Components"; 2006 IEEE International Conference on Electro/Information Technology; May 2006.

(Continued)

*Primary Examiner* — Ashford S Hayles
(74) *Attorney, Agent, or Firm* — Steven M. Greenberg, Esq.; Shutts & Bowen LLP (57) ABSTRACT

Embodiments of the present invention address deficiencies of the art in respect to manufacturing production and provide a novel and non-obvious method, system and computer program product for reuse of cancelled products that are partially manufactured. In one embodiment of the invention, a method for reusing a partially manufactured product during a manufacturing process can be provided. The method can include reading a configuration of the partially manufactured product and reading a set of rules that match a given configuration with one of a set of defined target configurations. The method can further include executing the set of rules upon the configuration of the partially manufactured product so as to match the configuration of the partially manufactured product with a target configuration. The method can further include initiating re-configuration of the partially manufactured product to the target configuration with which it was matched and stocking in inventory the partially manufactured product that has been re-configured to the target configuration.

20 Claims, 3 Drawing Sheets

(56) References Cited

U.S. PATENT DOCUMENTS

| | | | | |
|---|---|---|---|---|
| 6,167,383 | A * | 12/2000 | Henson | G06Q 10/087 703/13 |
| 6,236,901 | B1 * | 5/2001 | Goss | B23P 21/00 361/692 |
| 6,240,330 | B1 | 5/2001 | Kurtzberg et al. | |
| 6,272,300 | B1 * | 8/2001 | Fujiwara et al. | 399/113 |
| 6,338,045 | B1 * | 1/2002 | Pappas | 705/29 |
| 6,772,028 | B1 * | 8/2004 | Yen | G05B 19/4183 700/106 |
| 6,983,189 | B2 * | 1/2006 | Lu | 700/102 |
| 7,031,901 | B2 * | 4/2006 | Abu El Ata | G06F 17/10 703/1 |
| 7,082,343 | B2 * | 7/2006 | Pestow et al. | 700/101 |
| 7,200,454 | B2 | 4/2007 | Coppola et al. | |
| 7,219,081 | B1 * | 5/2007 | Davis | G06Q 30/08 705/37 |
| 7,467,073 | B2 * | 12/2008 | Nasr et al. | 703/6 |
| 7,596,508 | B1 * | 9/2009 | McGuffie | G06Q 10/0833 705/26.35 |
| 7,668,612 | B1 * | 2/2010 | Okkonen | G06F 8/65 700/95 |
| 7,676,897 | B2 * | 3/2010 | Keate | 29/402.07 |
| 7,739,080 | B1 * | 6/2010 | Beck et al. | 703/2 |
| 8,538,996 | B2 * | 9/2013 | Rehman | G06Q 10/087 707/795 |
| 2001/0029461 | A1 * | 10/2001 | Kobayashi | 705/8 |
| 2001/0047578 | A1 * | 12/2001 | Maruyama | B23P 21/004 29/426.1 |
| 2002/0023251 | A1 * | 2/2002 | Nasr | G06Q 10/06 716/136 |
| 2002/0042662 | A1 * | 4/2002 | Tsukishima | G06Q 10/087 700/95 |
| 2002/0072956 | A1 * | 6/2002 | Willems et al. | 705/10 |
| 2002/0099587 | A1 * | 7/2002 | Kakihana et al. | 705/7 |
| 2002/0116087 | A1 * | 8/2002 | Brown | G05B 19/00 700/213 |
| 2003/0078799 | A1 * | 4/2003 | Asano | G06Q 30/06 705/80 |
| 2003/0208902 | A1 * | 11/2003 | Sanders et al. | 29/783 |
| 2003/0233159 | A1 * | 12/2003 | Lu | G06Q 10/06 700/102 |
| 2004/0034566 | A1 * | 2/2004 | Nagata | 705/22 |
| 2004/0034577 | A1 * | 2/2004 | Van Hoose | G06Q 10/087 705/28 |
| 2004/0078106 | A1 * | 4/2004 | Campbell | G06Q 10/10 700/103 |
| 2004/0078430 | A1 * | 4/2004 | Aubert | G06Q 10/06 709/204 |
| 2004/0084520 | A1 * | 5/2004 | Muehl | G05B 19/4183 235/376 |
| 2004/0093225 | A1 * | 5/2004 | Bedner et al. | 705/1 |
| 2004/0093287 | A1 * | 5/2004 | Gupta et al. | 705/29 |
| 2005/0027555 | A1 * | 2/2005 | Forrest et al. | 705/1 |
| 2005/0055119 | A1 * | 3/2005 | Yen | G06Q 10/087 700/100 |
| 2005/0137919 | A1 | 6/2005 | Buckley et al. | |
| 2005/0143941 | A1 * | 6/2005 | Forth | G06Q 10/087 702/61 |
| 2005/0165653 | A1 * | 7/2005 | Meaney | G06Q 10/06 705/500 |
| 2005/0261947 | A1 * | 11/2005 | Alam | G06Q 10/025 705/300 |
| 2005/0283392 | A1 * | 12/2005 | Garrow | G06Q 10/06 705/7.22 |
| 2005/0283410 | A1 * | 12/2005 | Gosko | G06Q 30/06 705/26.44 |
| 2006/0085296 | A1 | 4/2006 | Strickland | |
| 2006/0100889 | A1 * | 5/2006 | Gosko | G06Q 30/02 705/26.1 |
| 2006/0142886 | A1 | 6/2006 | Ishibashi et al. | |
| 2006/0190291 | A1 * | 8/2006 | Erickson et al. | 705/1 |
| 2007/0005489 | A1 * | 1/2007 | Usui et al. | 705/37 |
| 2007/0027699 | A1 * | 2/2007 | Golding | G06Q 10/06 455/90.3 |
| 2007/0156439 | A1 * | 7/2007 | Fyda | G06Q 10/06 705/308 |
| 2007/0220047 | A1 * | 9/2007 | Barletta | G06Q 10/06 |
| 2007/0233300 | A1 * | 10/2007 | Jones | G06Q 10/06 700/99 |
| 2007/0299730 | A1 * | 12/2007 | Erickson et al. | 705/26 |
| 2008/0082427 | A1 * | 4/2008 | Gandhi | G06Q 10/087 705/28 |
| 2008/0154417 | A1 * | 6/2008 | Srikumar | G06Q 10/06 700/110 |
| 2008/0177788 | A1 * | 7/2008 | Dhawan | G06Q 10/087 |
| 2008/0215410 | A1 * | 9/2008 | Cheng et al. | 705/8 |
| 2008/0300710 | A1 * | 12/2008 | Cogswell | G06Q 10/06 700/105 |
| 2009/0125385 | A1 * | 5/2009 | Landvater | 705/10 |
| 2009/0125875 | A1 * | 5/2009 | Schmitter et al. | 717/101 |
| 2009/0248578 | A1 * | 10/2009 | Pollock | G06F 19/328 705/64 |
| 2009/0299513 | A1 * | 12/2009 | Suh | G06Q 10/06 700/107 |
| 2009/0321511 | A1 * | 12/2009 | Browne | B03B 9/061 235/375 |

OTHER PUBLICATIONS

Zhu, Ping, et al.; "Towards Constructing Reusable Specialization Components"; 2007 ACM SIGPLAN Symposium on Partial Evaluation and Semantics Based Program Manipulation PEPM 07; Jan. 2007.

Khayati, Oualid, et al.; "Components Retrieval System"; Laboratoire LSR-IMAG; France.

* cited by examiner

FIG. 3

CONVERTING ASSETS FOR REUSE DURING MANUFACTURING

BACKGROUND OF THE INVENTION

Field of the Invention

The present invention relates to commercial manufacturing processes, and more particularly to asset reuse management for commercial manufacturing processes.

Description of the Related Art

Because of the large amounts of customization selections available to consumers, custom built computer products, such as servers, server systems and database platforms, come in a wide variety of configurations. The variety in the configurations is attributed to the ranges and mixtures of hardware, software and instructional features available to consumers. Due to the potential diversity in custom built computer products, a custom built product can be one of a kind.

Cancellations of custom-built orders are common in the computer manufacturing industry. Often, a cancellation occurs in the middle of the manufacturing process. When this transpires, a manufacturer is left with a unique product (or work unit) in a partially manufactured state. (Note that a work unit refers to an incomplete product undergoing manufacturing wherein the work unit may refer to one part of a larger whole, i.e., an individually build-able portion that will later be integrated into the whole.) Ideally, manufacturers prefer to reuse the partially manufactured product or at least the parts that comprise the work unit. This poses a challenge when dealing with a partially-manufactured custom built product that doesn't fit neatly into the basis or make-up of another product or another configuration of a particular product. There are various conventional approaches to this problem, but each comes with its drawbacks.

One approach to this problem involves completely disassembling the partially-manufactured custom built product into its basic components, which are then re-used in other manufacturing lines. This approach, however, can be labor-intensive and time-consuming. Further, there may be various states of disassembly of the partially-manufactured custom built product that may fit neatly into the manufacturing line of another product. Re-use at this intermediate level would avoid wasted labor and/or time. For this reason, the full disassembly of the partially manufactured custom built product could result in significant wasted labor and/or time, and significantly increased potential for errors or damage.

Another approach to this problem involves setting aside the partially-manufactured custom built product and waiting for another order like the original so as to reuse the work unit. This approach, however, is uncertain and can lead to long waits, increased inventory holding costs and reduced storage space due to storage of the partially-completed work unit. Yet another approach to this problem involves selling the partially-manufactured custom built product. This approach is also uncertain and can lead to long waits, reduced storage space due to storage of the partially-completed work unit and eventual loss of invested time and resources because the partially-completed work unit must often be sold for less than it is worth or at least for less than a completed version of the product.

Thus, there is a need to overcome the deficiencies in the prior art and more particularly for a more efficient way to reuse cancelled custom-built products that are partially manufactured.

BRIEF SUMMARY OF THE INVENTION

Embodiments of the present invention address deficiencies of the art in respect to manufacturing production and provide a novel and non-obvious method, system and computer program product for reuse of cancelled products that are partially manufactured. In one embodiment of the invention, a method for reusing a partially manufactured product during a manufacturing process can be provided. The method can include reading a configuration of the partially manufactured product and reading a set of rules that match a given configuration with one of a set of defined target configurations. The method can further include executing the set of rules upon the configuration of the partially manufactured product so as to match the configuration of the partially manufactured product with a target configuration. The method can further include initiating re-configuration of the partially manufactured product to the target configuration with which it was matched and stocking in inventory the partially manufactured product that has been re-configured to the target configuration.

In another embodiment of the present invention, a computer program product comprising a computer usable medium embodying computer usable program code for reusing a partially manufactured product during a manufacturing process is provided. The computer program product includes computer usable program code for reading a configuration of the partially manufactured product and reading a set of rules that match a given configuration with one of a set of defined target configurations. The computer program product further includes computer usable program code for executing the set of rules upon the configuration of the partially manufactured product so as to match the configuration of the partially manufactured product with a target configuration. The computer program product further includes computer usable program code for initiating re-configuration of the partially manufactured product to the target configuration with which it was matched and stocking in inventory the partially manufactured product that has been re-configured to the target configuration.

In yet another embodiment of the invention, a computer system for reusing a partially manufactured product during a manufacturing process can be provided. The computer system can include a repository for storing a configuration of the partially manufactured product and a set of rules that match a given configuration with one of a set of defined target configurations. The computer system can further include a processor configured for reading the configuration of the partially manufactured product reading the set of rules and executing the set of rules upon the configuration of the partially manufactured product so as to match the configuration of the partially manufactured product with a target configuration. the processor is further configured for initiating re-configuration of the partially manufactured product to the target configuration with which it was matched and stocking in inventory the partially manufactured product that has been re-configured to the target configuration.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to manufacturing production and provide a novel and non-obvious method, system and computer program product for reuse of cancelled products that are partially manufactured. The present invention for reusing a partially manufactured product during a manufacturing process includes reading a configuration, such as a list of configuration attributes, of the partially manufactured product. Then, a set of rules that match a given configuration with one or more of a set of defined target configurations is read. A rule may include an if-portion that defines configuration attributes and a then-portion that identifies a target configuration. Then, the set of rules is executed upon the configuration of the partially manufactured product so as to match the configuration of the partially manufactured product with a target configuration. Finally, re-configuration of the partially manufactured product to the target configuration with which it was matched is initiated and the reconfigured product is stocked in inventory.

Figure 1:
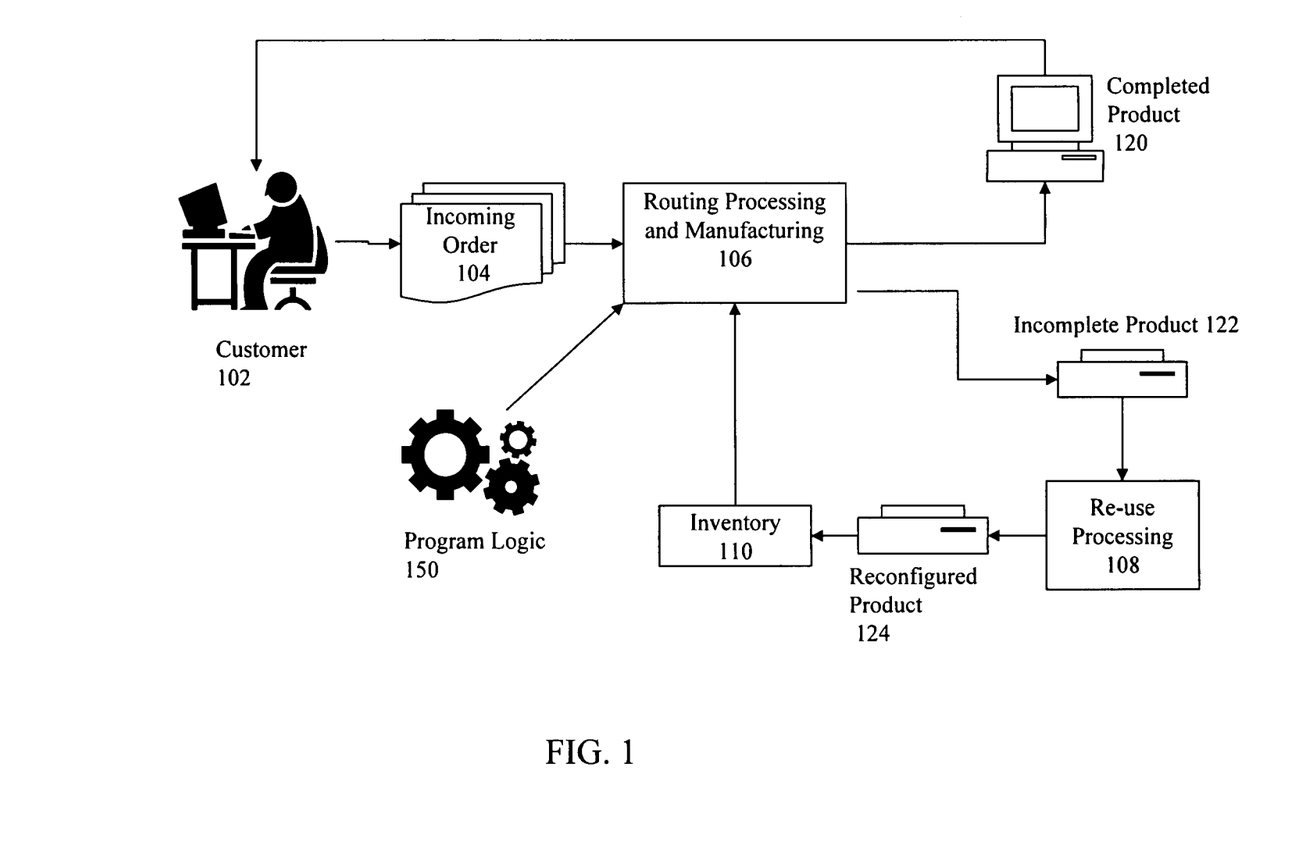
FIG. 1 is an illustration of a manufacturing production network incorporating intelligent reuse processing, according to one embodiment of the present invention.

FIG. 1 is an illustration of a manufacturing production network incorporating intelligent reuse processing, according to one embodiment of the present invention. The process depicted by FIG. 1 begins with a customer 102 placing an order 104 via a web site, telephone or mail. In advanced manufacturing environments where products are "built to customer order," an incoming order 104 can be processed by a mass routing processing and manufacturing system 106 wherein intelligent routing processing can be invoked to enable halting, initiating or resuming manufacturing of certain work units at predefined points. The mass routing processing and manufacturing system 106 draws upon inventory 110, which provides the materials and bases for the products manufactured by process 106. The mass routing processing and manufacturing system 106 may further include program logic 150 for enabling intelligent reuse of cancelled custom built products in a partially completed state.

Figure 2:
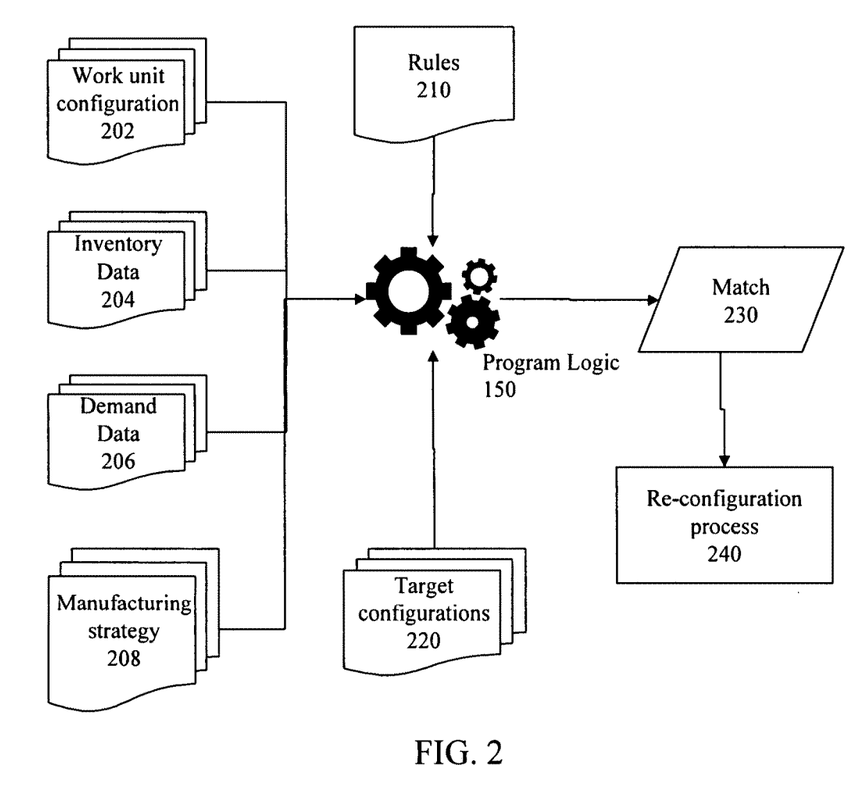
FIG. 2 is a block diagram showing the various components of a scheme for enabling intelligent reuse processing in a mass production system, according to one embodiment of the present invention.

Typically, a completed product 120 is produced by the process of FIG. 2 and it can be delivered to the customer 102. In the event of a cancellation of a custom-built order midway through the manufacturing process, the incomplete product or work unit 122 exits the manufacturing process 106. Execution of the program logic 150 enables intelligent reuse of cancelled incomplete product or work unit 122. The work unit 122 is reconfigured by undergoing a reconfiguration/reuse process 108, thereby producing one or more reconfigured work units 124, which is/are stocked in inventory 110 and thereby available to the manufacturing process 106 for future work orders. Thus, the work unit 122 is re-entered into the manufacturing process 106 for reuse.

FIG. 2 is a block diagram showing the various components of a scheme for enabling intelligent reuse processing in a mass production system, according to one embodiment of the present invention. FIG. 2 provides more detail on the method by which program logic 150 enables intelligent reuse of cancelled incomplete product or work unit 122 and re-entry of the work unit 122 into the manufacturing process 106 for reuse. In one embodiment, a server or computer implements the steps performed by program logic 150.

Program logic 150 reads the configuration data 202 for incomplete product or work unit 122. The configuration data 202 may be provided by a user or may reside on a file that is read by program logic 150. Configuration data may comprise a plurality of configuration items, which refer to one of possibly many configuration settings of a computer or server that together comprise a configuration status. A configuration item comprises a configuration attribute and a related value. Examples of configuration attributes are "product family," "part number" and "description." Each of the aforementioned configuration attributes may have a text string as an attribute value.

Another example of a configuration attribute is "static routing" and an example of a related value is "enabled." When a static routing is implemented, the value of the configuration attribute is set to "enabled." Otherwise, the value of the configuration attribute is set to "disabled." Additional examples of configuration attributes include local scripting administration, remote scripting administration, remote GUI administration and disk cache. The related value for each of the aforementioned configuration attributes can be "enabled" or disabled."

Program logic 150 further reads the inventory data 204 for the manufacturing process 106. The inventory data 204 may be provided by a user or may reside on a file that is read by program logic 150. Inventory data refers to data pertaining to current inventory levels, historic inventory levels and projected inventory levels.

Program logic 150 further reads the demand data 206 for the manufacturing process 106. The demand data 206 may be provided by a user or may reside on a file that is read by program logic 150. Demand data refers to data pertaining to current demand and projected or forecasted demand for various items, products or parts.

Program logic 150 further reads the manufacturing strategy 208 for the manufacturing process 106. The manufacturing strategy 208 may be provided by a user or may reside on a file that is read by program logic 150. Manufacturing strategy 208 refers to data pertaining to manufacturing goals that are desired. One example of a manufacturing strategy is a minimum criterion that must be met by a work unit 122 if it is to be matched to a defined target configuration.

Program logic 150 further reads the target configurations 220, which are a list of configurations to which the work unit 122 may be re-configured. The target configurations 220 may be provided by a user or may reside on a file that is read by program logic 150. Each target configuration in the target configurations 220 is associated with a description that provides configuration data, which may comprise a plurality of configuration items, which refer to one of possibly many configuration settings of a computer or server that together comprise a configuration status. Target configurations are configurations of a work unit that are more easily reabsorbed into the manufacturing process because they have been identified as configurations that are used or required during the manufacturing process.

Program logic 150 further reads rules 210. The rules 210 may be provided by a user or may reside on a file that is read by program logic 150. The rules are used to determine how to match the work unit 122 with one or more target configurations. A rule may take various forms. In one embodiment of the present invention, a rule is a text string that includes an if-portion defining criteria that must be met by the work unit 122 and a then-portion that identifies one or more target configurations in target configurations 220 as a match 230.

An if-portion may define a configuration item (such as a part number), an inventory data item (such as a quantity value), a demand data item (such as a forecasted demand value) and a manufacturing strategy item (such as a percentage match value). An if-portion may also include an on/off indicator that defines whether the rule is currently activated and/or dates during which the rule is activated.

In short, rules 210 are a set of statements that, if true, produce a match 230 with one or more target configurations from set 220. That is, any work unit that meets the criteria of the if-portion of a rule produces a match with the identified target configuration(s) in the then-portion of the rule. In one embodiment of the present invention, the if-portion is specified by listing one or more attribute values that, if present in a work unit, produce a match. An attribute value may be specified in a positive manner, wherein the existence of the specified attribute value produces a match. For example, an if-portion that specifies a "model number=550" would produce a match with a work unit having a model number of 550. Alternatively, an attribute value may be specified in a negative manner, wherein the lack of the specified attribute value produces a match. For example, an if-portion that specifies a "model number=NOT 550" would produce a match with a work unit having a model number of 770. Further, attribute values may be specified in a range such that any attribute value that falls within that range produces a match. For example, an if-portion that specifies a "500<model number<700" would produce a match with a work unit having a model number of 600. Additionally, attribute values may be specified using a wildcard. For example, an if-portion that specifies a "model number=6**" would produce a match with a work unit having a model number 655.

Since there are multiple rules 210, various matches occur. In this case, an algorithm may be used to determine which target configuration from the matching rules is used. Once a match 230 is made after execution of the rules 210 upon the read data (202, 204, 206, 208 and 220), the reconfiguration process 240 is initiated. The reconfiguration process 240 involves the reconfiguration of the work unit 122 into one or more target configurations identified in the match 230.

Figure 3:
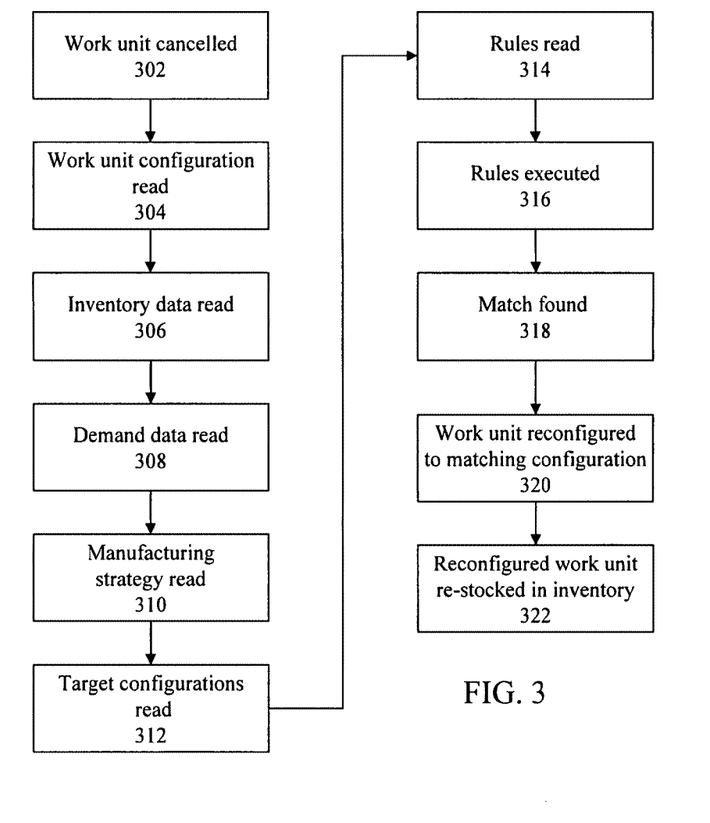
FIG. 3 is a flow chart depicting the control flow of an intelligent reuse process executed during manufacturing, according to one embodiment of the present invention.

FIG. 3 is a flow chart depicting the control flow of an intelligent reuse process executed during manufacturing, according to one embodiment of the present invention. The process of FIG. 3 may be executed by routing processing and manufacturing system 106 using program logic 150.

In block 302 the order behind a work unit 122 is cancelled and consequently the program logic 150 is executed. In block 304 the work unit configuration 202 is read. In block 306 the inventory data 204 is read, in block 308 the demand data 206 is read and in block 310 the manufacturing strategy 208 is read. In block 312 the target configurations 220 are read and in block 314 the rules 210 are read.

In block 316 the rules 210 are executed. Execution of the rules upon work unit 1222 comprises reading the if-portions defined in the rules 210 and searching for those values in the work unit 122. When matching values are found in the work unit 122, the target configuration(s) in the then-portion of the rule is/are considered a match. In block 318 a match 230 is found. A record may be made of the match 230, such as a computer file or an entry in a database. Alternatively, the match 230 may be displayed to a computer display or printed onto paper.

In block 320, the reconfiguration process 240 is executed. The reconfiguration process 240 involves the reconfiguration of the work unit 122 into the target configuration(s) identified in the match 230. The work unit 122 is reconfigured by undergoing a reconfiguration/reuse process 108, thereby producing a reconfigured work unit 124, which is stocked in inventory 110 in block 322 and thereby available to the manufacturing process 106 for future work orders. Thus, the work unit 122 is re-entered into the manufacturing process 106 for reuse.

Embodiments of the present invention are advantageous of the prior art because they allow for the automated reconfiguration of cancelled built-to-order work units so as to reuse the work unit in the manufacturing process. This feature increases reuse of work units and parts, thereby reducing waste, reducing expenditures and increasing resource availability. The process further lowers costs associated with complete disassembly of a cancelled work unit and minimizes the unavailability of parts used in a partially manufactured product.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for reusing a partially manufactured product during a manufacturing process, comprising:
    processing an order in program logic executing on a processor of a mass routing processing and manufacturing computer system to produce at least a partially manufactured but not yet complete product;
    registering a cancellation of the order in the program logic of the computer system subsequent to having processed the order in the program logic and having produced the partially manufactured product; and
    responsive to the registration of the cancellation of the order:
    reading a configuration of the partially manufactured product and identifying in the configuration, a part number of a part associated with the partially manufactured product;
    reading a set of rules that match a given configuration with one of a set of defined target configurations of a different product including a range of part numbers acceptable for use in building a product corresponding to one of the defined target configurations; and,
    executing a reconfiguration process in which the set of rules are applied to the configuration of the partially manufactured product so as to match the part number identified in the configuration of the partially manufactured product to the range of part numbers acceptable for use in building a different, yet to be manufactured product corresponding to the one of the defined target configurations, initiating a re-configuration of the partially manufactured product with respect to the one of the target configurations corresponding to the different, yet to be manufactured product with which the part number identified in the configuration of the partially manufactured product matched according to the rule specifying the range of part numbers, and subsequent to re-configuration in the one of the target configurations, placing back into inventory the re-configured partially manufactured product and rendering the re-configured partially manufactured product as available in the mass routing processing and manufacturing computer system for use in future work orders while remaining stocked in the inventory;
    receiving a new work order subsequent to the reconfiguration; and,
    completing the new work order for a complete product utilizing the re-configured partially manufactured product in the one of the target configurations in the inventory in order to complete manufacturing of the complete product.

2. The method of claim 1, wherein reading a configuration further comprises:
    reading a configuration of the partially manufactured product, wherein a configuration comprises a set of configuration attributes.

3. The method of claim 2, wherein reading a set of rules further comprises:
    reading a set of rules that match a given configuration with one of a set of defined target configurations, wherein a rule comprises an if-portion that defines a set of configuration attributes and a then-portion that identifies a target configuration.

4. The method of claim 3, wherein reading a set of rules further comprises:
    reading inventory data of the manufacturing process; and
    reading a set of rules that match a given configuration with one of a set of defined target configurations, wherein a rule comprises an if-portion that defines a set of configuration attributes and inventory data and a then-portion that identifies a target configuration.

5. The method of claim 3, wherein reading a set of rules further comprises:
    reading demand data of the manufacturing process; and
    reading a set of rules that match a given configuration with one of a set of defined target configurations, wherein a rule comprises an if-portion that defines a set of configuration attributes and demand data and a then-portion that identifies a target configuration.

6. The method of claim 3, wherein reading a set of rules further comprises:
    reading manufacturing strategy data of the manufacturing process; and
    reading a set of rules that match a given configuration with one of a set of defined target configurations, wherein a rule comprises an if-portion that defines a set of configuration attributes and manufacturing strategy data and a then-portion that identifies a target configuration.

7. The method of claim 3, wherein executing the set of rules further comprises:
    comparing the configuration attributes of the configuration of the partially manufactured product with the configuration attributes of the if-portion of each rule.

8. A computer program product comprising a non-transitory computer usable storage medium storing computer usable program code for reusing a partially manufactured product during a manufacturing process comprising:
    computer usable program code, which when executed by a processor, for processing an order in program logic of a mass routing processing and manufacturing computer system to produce at least a partially manufactured but not yet complete product;
    computer usable program code, which when executed by the processor, for registering a cancellation of the order in the program logic of the computer system;
    computer usable program code, which when executed by the processor, for reading a configuration of the partially manufactured product including a part number in response to the cancellation;
    computer usable program code, which when executed by the processor, for reading a set of rules that match a given configuration with one of a set of defined target configurations including a range of part numbers acceptable for use in building a corresponding product;
    computer usable program code, which when executed by the processor, for executing a reconfiguration process comprising:
    processing an order in program logic executing on a processor of a mass routing processing and manufacturing computer system to produce at least a partially manufactured but not yet complete product;
    registering a cancellation of the order in the program logic of the computer system subsequent to having processed the order in the program logic and having produced the partially manufactured product; and responsive to the registration of the cancellation of the order:
  reading a configuration of the partially manufactured product and identifying in the configuration, a part number of a part associated with the partially manufactured product;
  reading a set of rules that match a given configuration with one of a set of defined target configurations of a different product including a range of part numbers acceptable for use in building a product corresponding to one of the defined target configurations; and,
  executing a reconfiguration process in which the set of rules are applied to the configuration of the partially manufactured product so as to match the part number identified in the configuration of the partially manufactured product to the range of part numbers acceptable for use in building a different, yet to be manufactured product corresponding to the one of the defined target configurations, initiating a re-configuration of the partially manufactured product with respect to the one of the target configurations corresponding to the different, yet to be manufactured product with which the part number identified in the configuration of the partially manufactured product matched according to the rule specifying the range of part numbers, and subsequent to re-configuration in the one of the target configurations, placing back into inventory the re-configured partially manufactured product and rendering the re-configured partially manufactured product as available in the mass routing processing and manufacturing computer system for use in future work orders while remaining stocked in the inventory;
  receiving a new work order subsequent to the reconfiguration; and,
  completing the new work order for a complete product utilizing the re-configured partially manufactured product in the one of the target configurations in the inventory in order to complete manufacturing of the complete product.

9. The computer program product of claim 8, wherein the computer usable program code for reading a configuration further comprises:
  computer usable program code for reading a configuration of the partially manufactured product, wherein a configuration comprises a set of configuration attributes.

10. The computer program product of claim 9, wherein the computer usable program code for reading a set of rules further comprises:
  computer usable program code for reading a set of rules that match a given configuration with one of a set of defined target configurations, wherein a rule comprises an if-portion that defines a set of configuration attributes and a then-portion that identifies a target configuration.

11. The computer program product of claim 10, wherein the computer usable program code for reading a set of rules further comprises:
  computer usable program code for reading inventory data of the manufacturing process; and
  computer usable program code for reading a set of rules that match a given configuration with one of a set of defined target configurations, wherein a rule comprises an if-portion that defines a set of configuration attributes and inventory data and a then-portion that identifies a target configuration.

12. The computer program product of claim 11, wherein the computer usable program code for reading a set of rules further comprises:
  computer usable program code for reading demand data of the manufacturing process; and
  computer usable program code for reading a set of rules that match a given configuration with one of a set of defined target configurations, wherein a rule comprises an if-portion that defines a set of configuration attributes and demand data and a then-portion that identifies a target configuration.

13. The computer program product of claim 11, wherein the computer usable program code for reading a set of rules further comprises:
  computer usable program code for reading manufacturing strategy data of the manufacturing process; and
  computer usable program code for reading a set of rules that match a given configuration with one of a set of defined target configurations, wherein a rule comprises an if-portion that defines a set of configuration attributes and manufacturing strategy data and a then-portion that identifies a target configuration.

14. The computer program product of claim 11, wherein the computer usable program code for executing the set of rules further comprises:
  computer usable program code for comparing the configuration attributes of the configuration of the partially manufactured product with the configuration attributes of the if-portion of each rule.

15. A computer system for reusing a partially manufactured product during a manufacturing process, comprising:
  a repository for storing a configuration of the partially manufactured product and a set of rules that match a given configuration with one of a set of defined target configurations; and
  a computer with at least one processor and memory executing computer useable instructions for:
  processing an order in program logic executing on a processor of a mass routing processing and manufacturing computer system to produce at least a partially manufactured but not yet complete product;
  registering a cancellation of the order in the program logic of the computer system subsequent to having processed the order in the program logic and having produced the partially manufactured product; and
  responsive to the registration of the cancellation of the order:
    reading a configuration of the partially manufactured product and identifying in the configuration, a part number of a part associated with the partially manufactured product;
    reading a set of rules that match a given configuration with one of a set of defined target configurations of a different product including a range of part numbers acceptable for use in building a product corresponding to one of the defined target configurations; and,
    executing a reconfiguration process in which the set of rules are applied to the configuration of the partially manufactured product so as to match the part number identified in the configuration of the partially manufactured product to the range of part numbers acceptable for use in building a different, yet to be manufactured product corresponding to the one of the defined target configurations, initiating a re-configuration of the partially manufactured product with respect to the one of the target configurations corresponding to the different, yet to be manufactured product with which the part number identified in the configuration of the partially manufactured product matched according to the rule specifying the range of part numbers, and subsequent to re-configuration in the one of the target configurations, placing back into inventory the re-configured partially manufactured product and rendering the re-configured partially manufactured product as available in the mass routing processing and manufacturing computer system for use in future work orders while remaining stocked in the inventory;

receiving a new work order subsequent to the reconfiguration; and, completing the new work order for a complete product utilizing the re-configured partially manufactured product in the one of the target configurations in the inventory in order to complete manufacturing of the complete product.

16. The computer system of claim 15, wherein a configuration comprises a set of configuration attributes.

17. The computer system of claim 16, wherein a rule comprises an if-portion that defines a set of configuration attributes and a then-portion that identifies a target configuration.

18. The computer system of claim 17, wherein the processor is further configured for:

reading inventory data of the manufacturing process from the repository and wherein a rule includes an if-portion that defines inventory data.

19. The computer system of claim 17, wherein the processor is further configured for:

reading demand data of the manufacturing process from the repository and wherein a rule includes an if-portion that defines demand data.

20. The computer system of claim 17, wherein the processor is further configured for:

reading manufacturing strategy data of the manufacturing process from the repository and wherein a rule includes an if-portion that defines manufacturing strategy data.

* * * * *